(12) United States Patent
Palm et al.

(10) Patent No.: US 12,415,651 B2
(45) Date of Patent: Sep. 16, 2025

(54) ADJUSTABLE REUSABLE PACKAGING CRATE TO ACCOMMODATE MULTIPLE PRODUCT SKUS

(71) Applicant: The Clorox Company, Oakland, CA (US)

(72) Inventors: Matthias Palm, Pleasanton, CA (US); Benjamin Ma, Pleasanton, CA (US); Gary Paulsen, Chicago, IL (US); Kerry D. Azelton, Pleasanton, CA (US); Daniel Block, Walnut Creek, CA (US)

(73) Assignee: THE CLOROX COMPANY, Oakland, CA (US)

( * ) Notice: Subject to any disclaimer, the term of this patent is extended or adjusted under 35 U.S.C. 154(b) by 72 days.

(21) Appl. No.: 18/446,269

(22) Filed: Aug. 8, 2023

(65) Prior Publication Data
US 2024/0067401 A1     Feb. 29, 2024

Related U.S. Application Data

(60) Provisional application No. 63/401,791, filed on Aug. 29, 2022.

(51) Int. Cl.
B65D 21/08     (2006.01)
B65D 25/24     (2006.01)
B65D 25/30     (2006.01)

(52) U.S. Cl.
CPC ........... B65D 21/086 (2013.01); B65D 25/24 (2013.01); B65D 25/30 (2013.01)

(58) Field of Classification Search
CPC .... B65D 11/1833; B65D 19/18; B65D 21/08; B65D 21/086; B65D 2519/00
See application file for complete search history.

(56) References Cited

U.S. PATENT DOCUMENTS

| | | | | |
|---|---|---|---|---|
| 4,591,065 A | * | 5/1986 | Foy | B65D 19/18 206/509 |
| 6,076,692 A | * | 6/2000 | Avot | B65D 21/086 220/4.03 |
| 2007/0017921 A1 | * | 1/2007 | Carmona | B65D 21/086 220/666 |

* cited by examiner

*Primary Examiner* — Andrew T Kirsch
(74) *Attorney, Agent, or Firm* — Workman Nydegger (57) ABSTRACT

An adjustable reusable packaging crate includes four side panels wherein the side panels contain a floating handle mechanism and a floor panel wherein the floor panel contains pegs that lock into an associated center grid lock panel. The adjustable reusable packaging crate is configured to allow adjustment between two size dimensions (e.g., 12 inches×8 inches×10.25 inches versus 17 inches×11 inches by 10.25 inches). In addition, the adjustable reusable packaging crate is configured to break down into a flat generally planar state for easy storage when empty, with no detachable parts.

20 Claims, 12 Drawing Sheets

ADJUSTABLE REUSABLE PACKAGING CRATE TO ACCOMMODATE MULTIPLE PRODUCT SKUS

CROSS REFERENCE TO RELATED APPLICATIONS

This application claims the benefit of and priority to U.S. Provisional Patent Application Ser. No. 63/401,791 filed on Aug. 29, 2022, and entitled "ADJUSTABLE REUSABLE PACKAGING CRATE TO ACCOMMODATE MULTIPLE PRODUCT SKUS," which is incorporated herein by reference in its entirety.

FIELD OF THE INVENTION

Embodiments of the present invention generally relate to reusable packaging crates (RPCs) that are adjustable in size to accommodate multiple different products. In particular, some embodiments of the disclosed invention include an RPC that can assume multiple different configurations so as to accommodate products of a variety of shapes and sizes, while also maintaining the accessibility of the handles of the RPC regardless of its configuration. Additionally, embodiments of the RPC break down to a flat structure with no loose or detached components for easy storage, handling and effective transportation.

BACKGROUND

A number of different packaging products are used to move products from one location to another. These packaging products may be single use, disposed of once the product reaches the retail store, and/or may be configured in a way that makes them difficult to use for multiple types of product SKUs of various sizes and configurations. Thus, such packaging products result in large amounts of waste and inefficiencies in the supply chain process.

While multiple packaging products exist, including cardboard corrugate boxes and milk crates, they each present their own unique challenges. Cardboard boxes, for example, may be difficult to stack, cause increased waste (as they are not particularly durable to be reused numerous times), and require box cutters for breaking down the boxes, thereby introducing a safety hazard. In comparison, the common milk crate may be reusable, however, these crates have fixed configurations and as a result are limited in terms of the shapes and sizes of the products that they can accommodate. In addition, such milk crates take up significant space when emptied, requiring significant space for storage and transportation, even when empty.

Additionally, the carbon footprint associated with traditional non-reusable corrugate packaging materials is immense. Even though corrugate containers are recyclable over several cycles (e.g., 7 cycles), the amount of energy that goes into the production, transportation, and eventual disposal of these packaging materials is significant. From a business perspective, these products account for significant cost while also having negative environmental consequences.

In light of considerations such as those noted above, it would be an advancement in the field to provide packaging containers that are reusable, and whose configuration is modifiable to accommodate different products of various shapes and sizes. Due to their reusability and adjustability, packaging containers according to example embodiments of the invention may be used numerous times and for a multitude of products. It would be a further advantage if such a container were collapsible when empty, for storage or transportation.

ASPECTS OF AN EXAMPLE EMBODIMENT

Embodiments within the scope of the invention may be effective in overcoming one or more of the problems in the art, although it is not required that any embodiment resolve any particular problem(s). In general, embodiments of the present invention are directed to adjustable reusable packaging crates that may be used for a variety of different products, examples of which include, but are not limited to, pre-packaged condiments and other foods, chemical cleaning compositions, disinfecting wipes, as well as a wide variety of other consumer products.

Some embodiments of the adjustable reusable packaging crate may have an adjustable length and/or adjustable width. In some embodiments, adjustments to the width and length may be implemented by way of an adjustable floor panel and adjustable side panels. The floor panel may include a plurality of pegs and a center grid lock panel. The center grid lock panel may snap on to the pegs, locking the floor panel into the desired dimensions. The center grid lock panel may then be pulled off of the pegs to unlock the floor panel, allowing the floor panel to expand in width and/or length. Each side panel may similarly be expandable to allow expansion of the crate width, length, or both width and length.

The side panels may each include a floating handle mechanism which is operative to lock the side panels into place, for example, by locking into grooves located on the side panels. Once the side panels are locked, the side panels may be released by moving the floating handle mechanism down which releases the floating handle mechanism from grooves positioned in a top portion of the handle, allowing the side panels to be adjusted. Embodiments of the side panels may comprise a captured wall design allowing adjustment of the wall length, so that products of various shapes and sizes can fit easily within the crate regardless of configuration (e.g., in the crate's smaller dimensions or expanded configuration). In some embodiments, the crate may break down from a fully assembled state to a flat, generally planar state with no loose or detached components. Such a configuration provides for easy storage and transportation, when empty.

Further features and advantages of the present invention will become apparent to those of ordinary skill in the art in view of the detailed description of preferred embodiments below.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

I. Definitions

Before describing the present invention in detail, it is to be understood that this invention is not limited to particularly exemplified parameters that may, of course, vary. It is also to be understood that the terminology used herein is for the purpose of describing particular embodiments of the invention only and is not intended to limit the scope of the invention in any manner.

All publications, patents and patent applications cited herein, whether supra or infra, are hereby incorporated by reference in their entirety to the same extent as if each individual publication, patent, or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an" and "the" include plural referents unless the content clearly dictates otherwise. Thus, for example, reference to a "panel" includes one, two or more panels.

Unless otherwise stated, all percentages, ratios, parts, and amounts used and described herein are by weight.

Numbers, percentages, ratios, or other values stated herein may include that value, and other values that are about or approximately the stated value, as would be appreciated by one of ordinary skill in the art. As such, all values herein are understood to be modified by the term "about". Such values thus include an amount or state close to the stated amount or state that still performs a desired function or achieves a desired result. A stated value should therefore be interpreted broadly enough to encompass values that are at least close enough to the stated value to perform a desired function or achieve a desired result, and/or values that round to the stated value. The stated values include at least the variation to be expected in a typical manufacturing or other process, and may include values that are within 10%, within 5%, within 1%, etc. of a stated value.

Some ranges may be disclosed herein. Additional ranges may be defined between any values disclosed herein as being exemplary of a particular parameter. All such ranges are contemplated and within the scope of the present disclosure.

As used herein, the term "between" is inclusive of any endpoints noted relative to a described range.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II. Introduction

Reference will now be made in detail to aspects of various embodiments of the present disclosure, examples of which are illustrated in the accompanying drawings. While described in conjunction with these embodiments, it will be understood that they are not intended to limit the disclosure to these embodiments.

In general, embodiments of the invention may be employed in packaging, carrying, and/or conveying a variety of products such as, pre-packaged condiments or other foods, cleaning compositions, disinfecting wipes, and other common pre-packaged retail items. In particular, some embodiments of the invention may be used to transport already packaged products between locations and/or to store such products in warehouses, production facilities, or retail stores. Examples of products that some embodiments may be used to carry include but are not limited to condiment bottles, such as salad dressing, ketchup, and pasta sauce, dairy products, such as milk, creamer, and yogurt, beverages, pet food, litter, and other supplies, cleaning compositions, cleaning or disinfecting wipes, laundry and dishwasher detergents, and any other pre-packaged products that may be stored and/or transported.

A. Example Adjustable Reusable Packaging Crate

Figure 1:
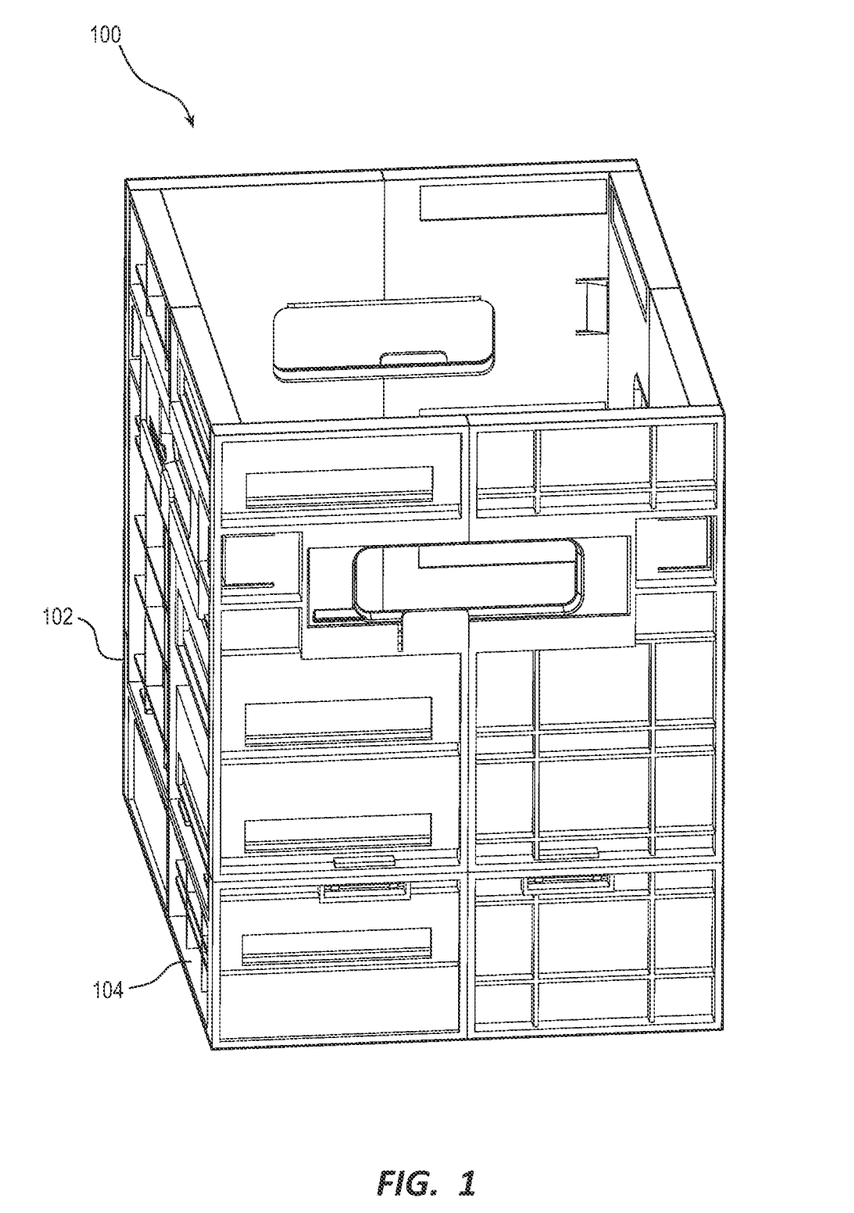
FIG. 1 is a perspective view of an exemplary adjustable reusable packaging crate, shown in its smaller configuration (e.g., 12 inches×8 inches×10.25 inches).

Directing attention first to FIG. 1, details are given relating to an example of a reusable adjustable packaging crate 100. In some embodiments, the adjustable reusable crate may be formed of high-density polyethylene, polypropylene, or any of a wide variety of other appropriate materials (e.g., various polymers) for packaging crates. In an embodiment, the crate is formed from recycled materials.

The adjustable reusable packaging crate 100 is formed with four vertical side panels 102 as well as a horizontal floor panel 104. Some embodiments may include solid and/or semi-solid panels (with openings or cavities) for the side panels 102 and the floor panel 104. In embodiments with semi-solid panels as shown, the side or floor panels may include openings therethrough or cavities therein, and may include a linear pattern, a crisscross pattern, a square pattern, and/or other possible patterns as well as combinations of applicable patterns formed from a series of ribs or similar structures to define the panels.

Figure 2:
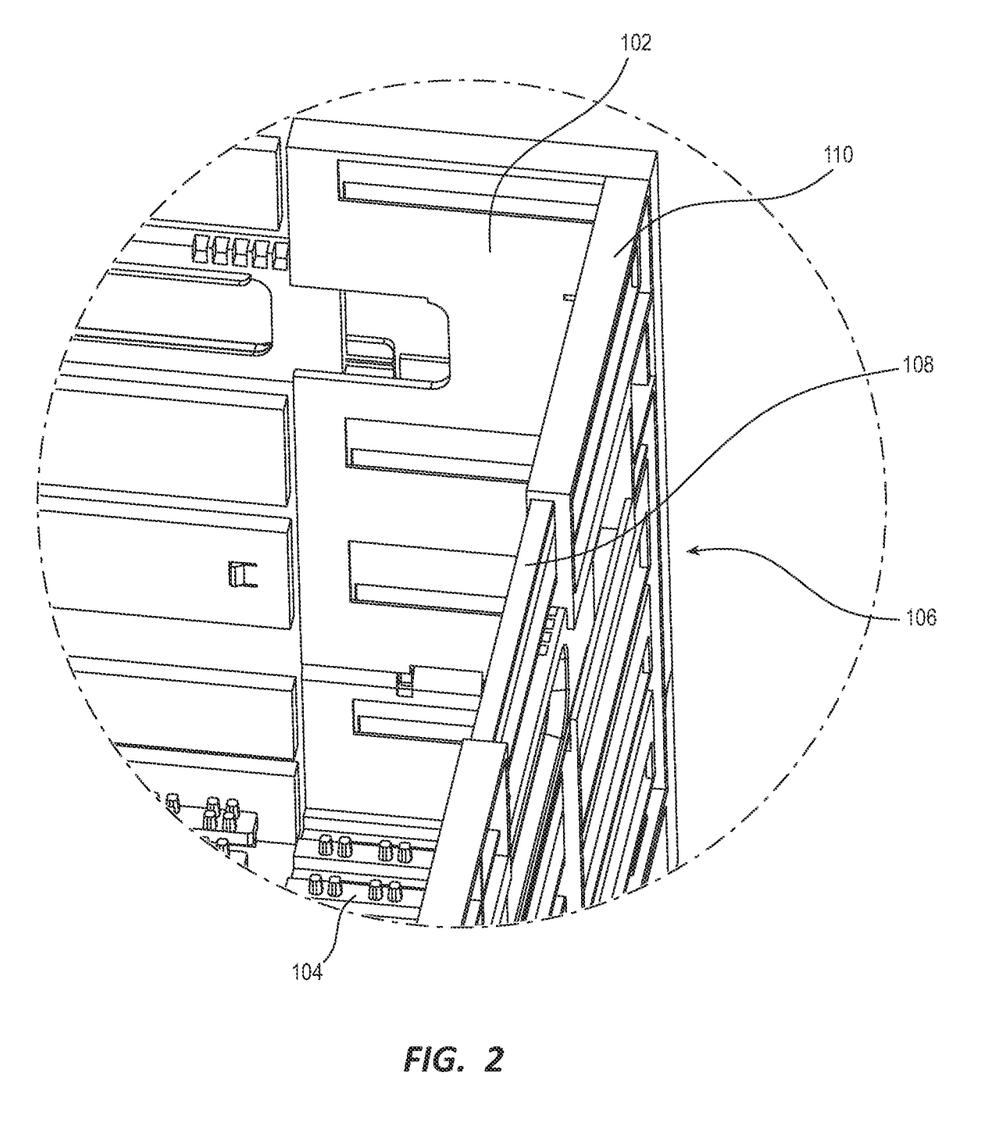
FIG. 2 shows an example of a capture wall design present in the side panel, showing a pocket door where the center portion of the capture wall design slides relative to and within an outside portion, to accommodate increased wall length.

The side panels may include a captured wall design (e.g., a sliding pocket door configuration), as shown in FIG. 2, to allow the side panels to adjust in wall length. Such a design includes a center portion 108 of the side panel 102 which is received into and fits seamlessly between two outer portions 110 of the side panel 102. When in the expanded state, as shown in the side panel of FIG. 2, the center portion 108 may be partially or substantially fully exposed, in a telescoping sliding arrangement, relative to adjacent outer panel portions 110. When the adjustable reusable packaging crate 100 is in its smallest dimensions (see FIG. 1), the center portion 108 is completely inserted and enclosed within the two outer portions 110 of a given side panel 102. Configurations between fully expanded and the adjustable reusable packaging crate's smallest dimensions may be possible in particular embodiments. In other words, partial expansion of the side panels and floor panel may be possible in some embodiments. For example, in an embodiment, any given side panel or floor panel may be partially expanded, such as to 25 percent, to 50 percent, or to 75 percent of a fully expanded configuration.

Figure 3:
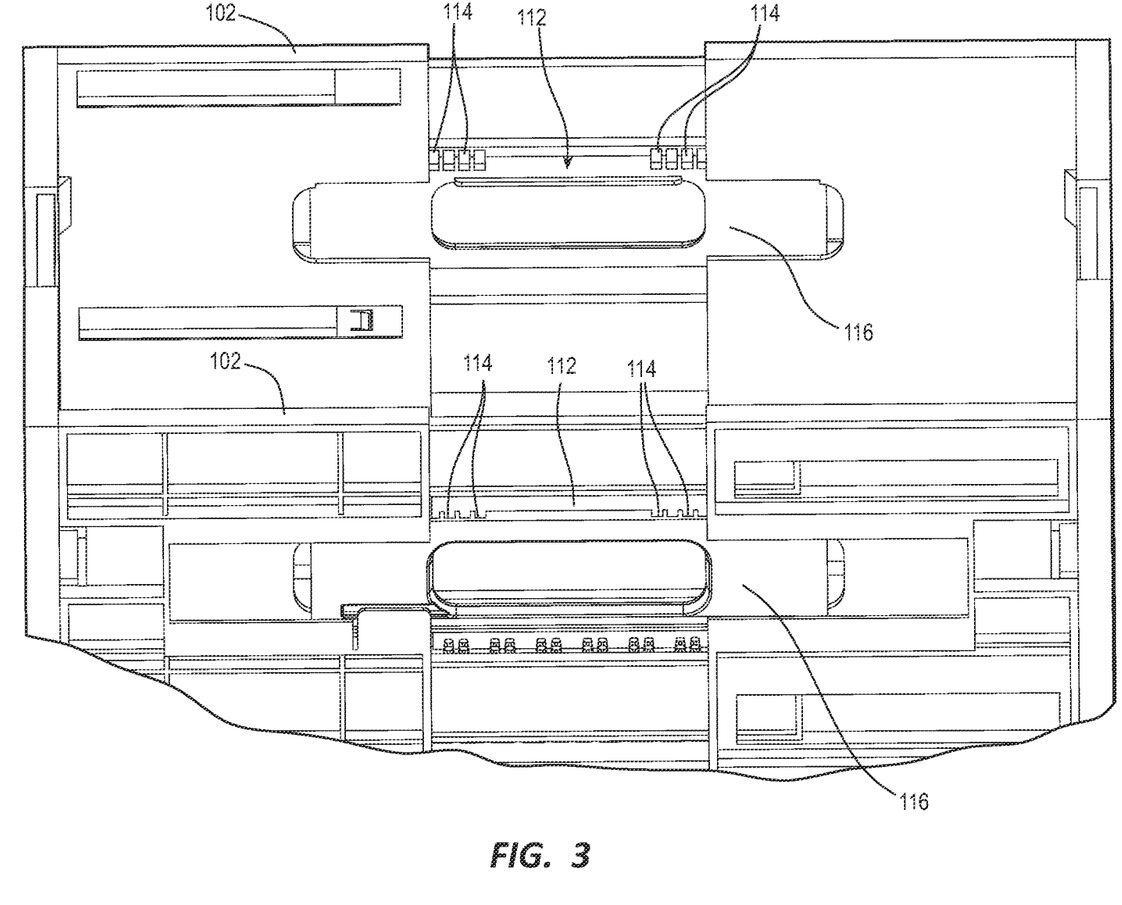
FIG. 3 shows an example of a floating handle mechanism included in a side panel.

Directing attention to FIG. 3, some embodiments may include a floating handle mechanism 112 on some or all side panels 102. In some embodiments, the floating handle mechanism 112 includes grooves 114 on the top of the handle 116 which when the handle is pushed upwards will lock the captured wall design described above in place. For example, when the handle 116 is pushed up, the side panel 102 associated with the handle 116 is no longer able to expand until the handle is pressed downward, releasing the top grooves 114 (e.g., releasing mating protrusions associated with panel 102, which engage in grooves 114). As such, with the handle up, the RPC may be locked in the selected configuration. Other embodiments may include other handle designs which include hooks, latches, knobs, or other appropriate handle structure configured to lock the handles and/or side panels in a desired configuration.

FIGS. 4-7 illustrate an example of the floor panel 104 emphasizing various features found in certain embodiments. The floor panel 104 contains a plurality of upwardly projecting pegs 118 as well as a center grid lock panel 120, which is received and fits over such pegs 118. The underside of panel 120 includes openings or cavities configured to receive and mate with pegs 118. The center grid lock panel 120 and pegs 118 are configured to lock together to hold the floor panel 104 in particular length and width dimensions, as selected by the user.

Figure 4:
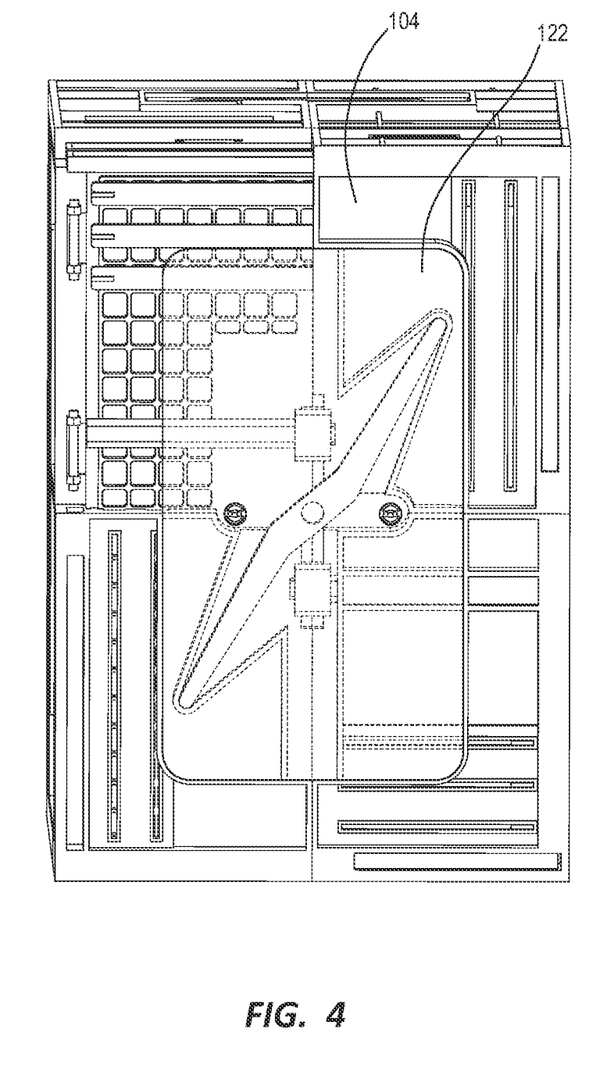
FIG. 4 shows a bottom view of the reusable packaging crate, illustrating an exemplary center grid lock panel.

FIG. 4 shows a bottom isometric view of an exemplary adjustable reusable packaging crate 100 emphasizing the center grid lock panel 120. In this embodiment the center grid lock panel 120 is shown as having a non-moveable (fixed) bottom portion 122 which attaches the center grid lock panel 120 to the floor panel 104.

Figure 5:
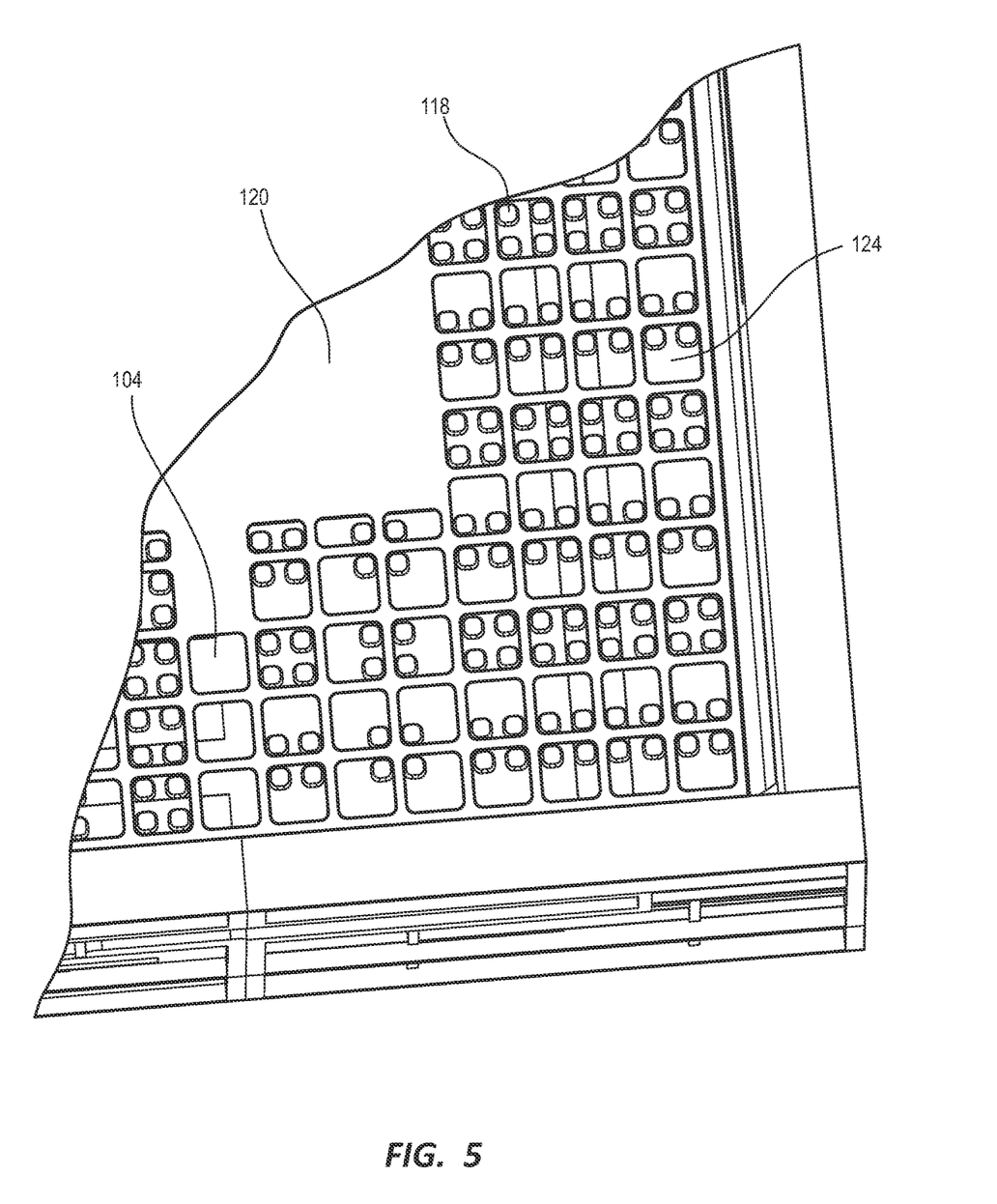
FIG. 5 shows a top view of the exemplary center grid lock panel, showing its locking interaction with pegs on the floor panel.

Continuing to discuss the floor panel 104 and center grid lock panel 120, FIG. 5 illustrates an example of the center grid lock panel 120 configured to fit over the pegs 118 extending upwardly from the floor panel 104. In this illustrated embodiment, the center grid lock panel 120 has a pattern formed from a plurality of square or rectangular openings 124 which can push over the pegs 118, locking the two together. In an embodiment, openings 124 may extend through the full thickness of the grid lock panel. In another embodiment, the openings may rather be configured as recesses, open only at the bottom end, to receive the pegs. When the pegs 118 are inserted into the openings 124 of the center grid lock pattern 120, the floor panel 104 is no longer able to expand, but is locked in a particular set of length and width dimensions. Other embodiments may include other locking mechanisms such as straps, hooks, keyed "puzzle piece" connections, knobs, or other appropriate means to lock the floor panel's dimensions in place.

As shown in FIG. 4, the bottom surface of the walls of the crate may include one or more recesses formed therein. Such recesses could nest or interlock with one or more corresponding projecting tabs, formed into the top surface of the walls of the crate (not shown, but apparent where they could be provided, in FIGS. 1 and 8). Such nesting or interlocking structures in the top and bottom surfaces of the vertical walls would facilitate easy stacking of multiple crates on top of one another. Of course the relative locations of the recesses and projecting tabs could be reversed, still providing similar functionality (e.g., projecting tabs on the bottom surface of the wall, and recesses in the top surface of the wall).

Figure 6:
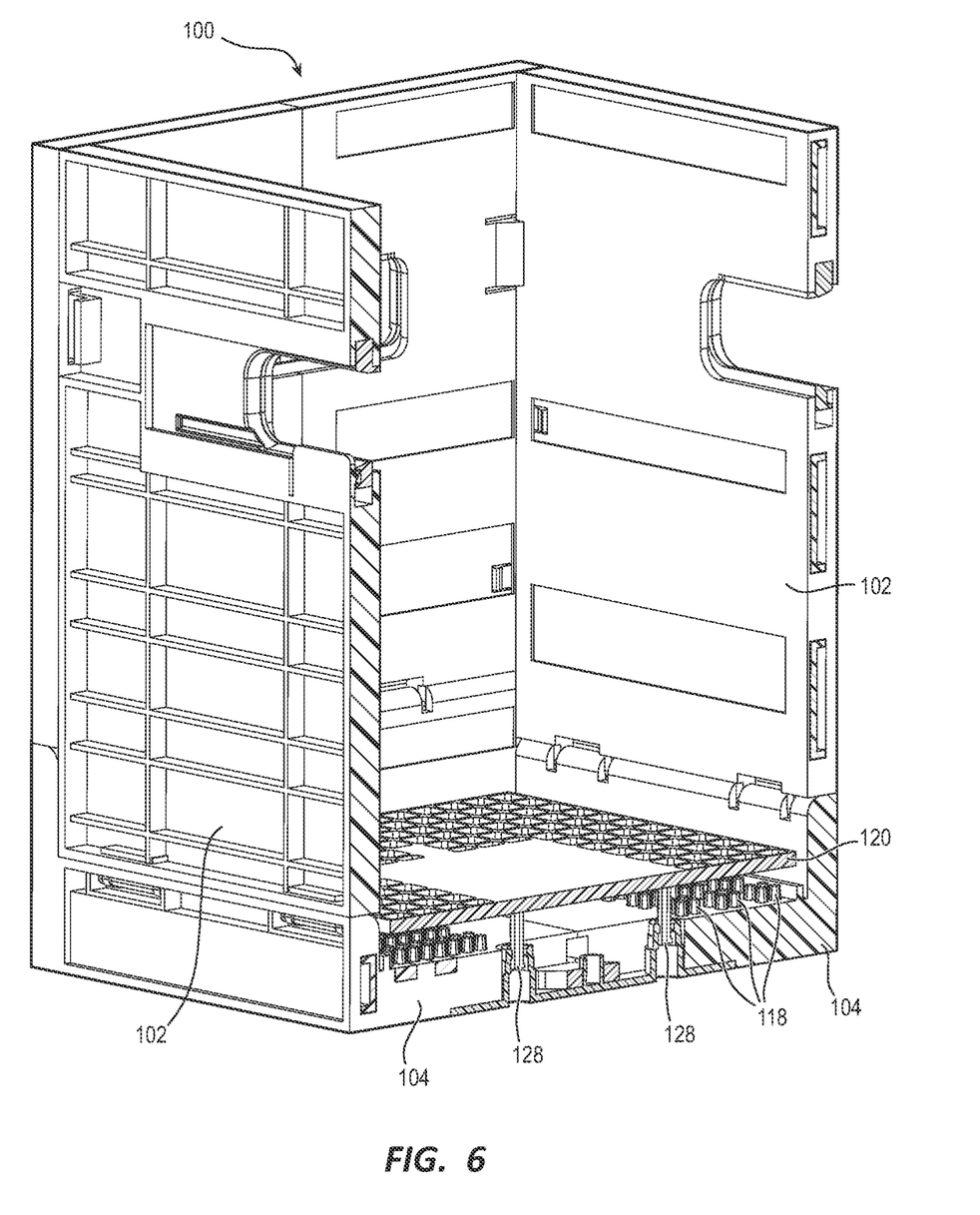
FIG. 6 shows a cut-away perspective view of the reusable packaging crate, illustrating how the center grid lock panel is configured to lift up, so as to unlock from the pegs, allowing adjustment of the dimensions of the floor of the crate.

FIG. 6 illustrates an example of how the center grid lock panel 120 can be attached to the floor panel 104. In the illustrated embodiment, there is a push mechanism 128 configured to allow the center grid lock panel 120 to move up and down with respect to the remainder of the crate (e.g., the floor panel 104). When pulled up, the center grid lock panel 120 is released from the pegs 118 on the floor panel 104. In contrast, when the center grid lock panel 120 is pressed down, it locks in place with the pegs 118 on the floor panel 104. The push mechanism 128 may be spring biased or include other mechanisms for biasing mechanism to one position or another. In another embodiment, no biasing of the mechanism 128 may be provided.

Figure 7:
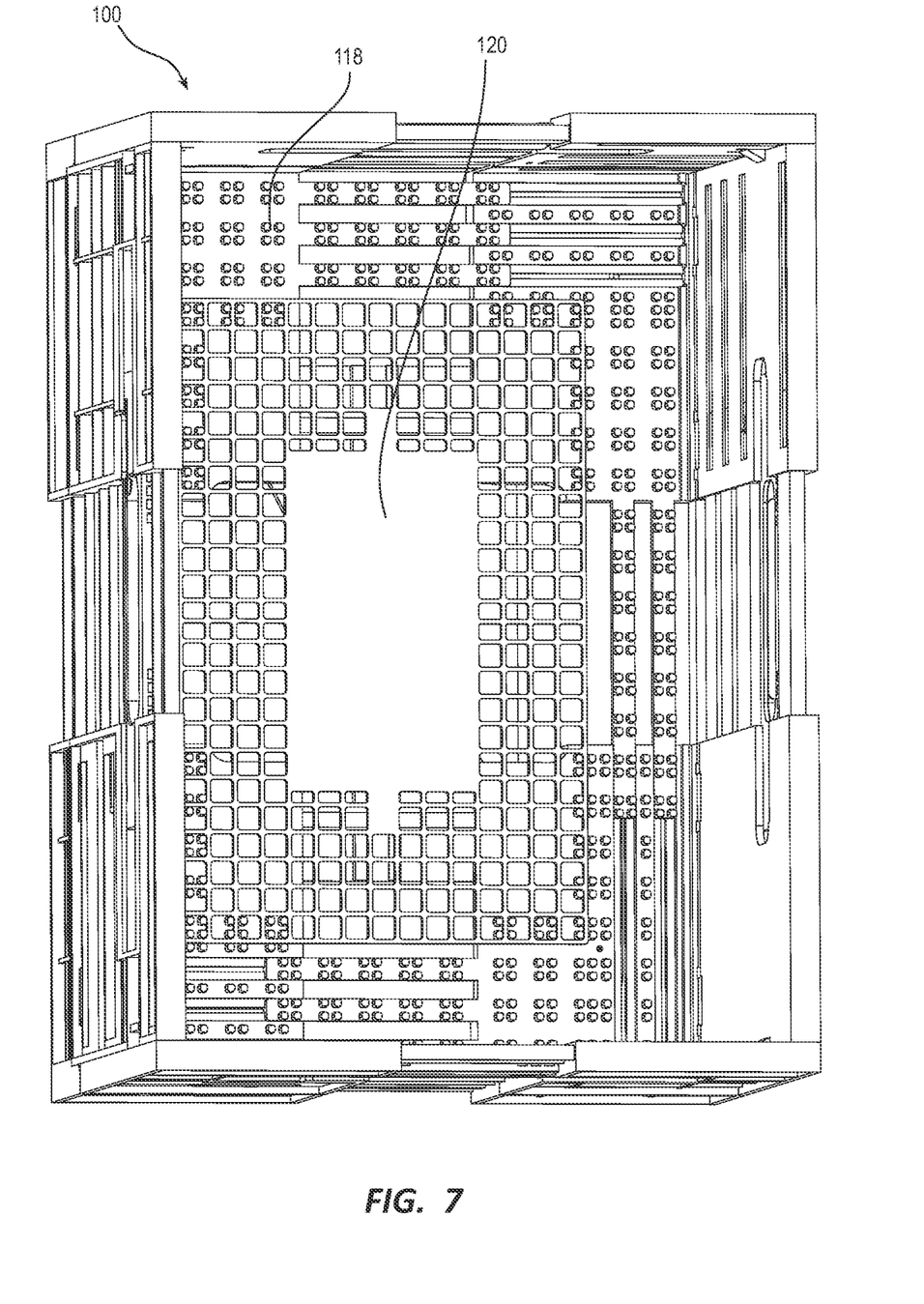
FIG. 7 shows a top view down into the RPC, showing an example floor panel with a center grid lock panel and pegs, illustrating their interaction with one another.

FIG. 7 illustrates a view of the floor of the adjustable reusable packaging crate 100 including the center grid lock panel 120 attached over the plurality of pegs 118 of the underlying panel 104. In this example, the center grid lock panel 120 is pressed down therefore interacting with the pegs 118 and locking the length and width dimensions into place. In the illustrated configuration, the crate is in its expanded configuration, e.g., 17 inches×11 inches×10.25 inches. In an embodiment, the center grid lock panel may be sized to or approximately to floor size of the smaller crate configuration, e.g., 12 inches×8 inches. As shown, in FIG. 7, the floor panel has been expanded by 5 inches in length (from 12 to 17 inches) and 3 inches in width (from 8 to 11 inches).

B. Example Adjustments

Attention is next given to the operational details related to how an exemplary adjustable reusable packaging crate 100 may adjust in width, length, or both width and length.

Figure 8:
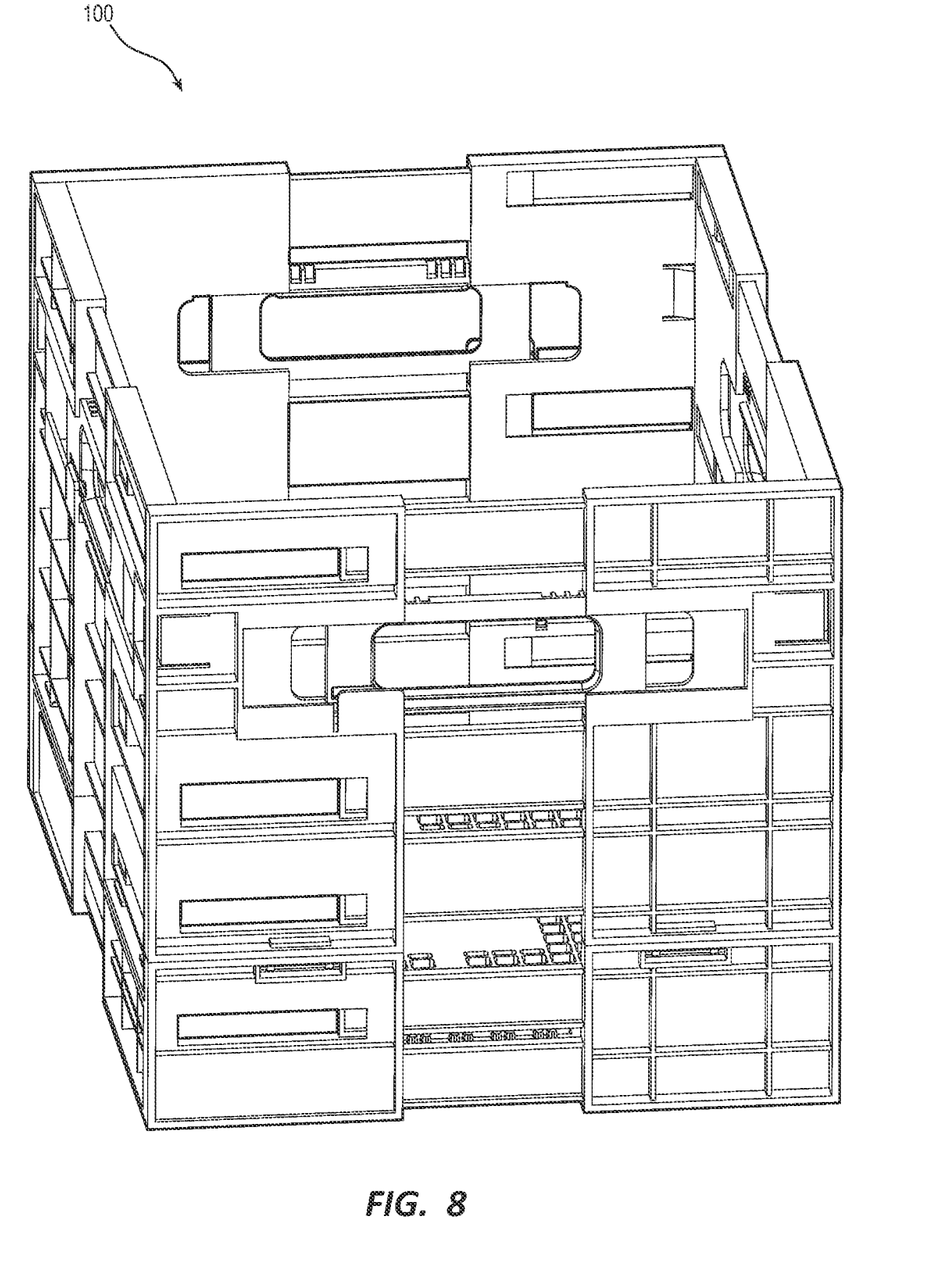
FIG. 8 shows an example of the RPC of FIG. 1, shown in the expanded configuration (e.g., 17 inches×11 inches× 10.25 inches).

FIG. 8 illustrates an example of the adjustable reusable packaging crate 100 once the crate has been expanded in both width and length. Some embodiments may be able to expand in only length while other embodiments may be able to expand in only width. Embodiments may also include adjustable reusable packaging crates that may be able to expand in both length and width, as illustrated.

The example embodiment in FIG. 1 can have initial dimensions of 12 inches long, 8 inches wide, and 10.25 inches high. When expanded, the example embodiment of FIG. 8 can expand to 17 inches long, 11 inches wide, and 10.25 inches high. By way of example, other embodiments may expand from 5 to 20 inches long, 2 to 15 inches wide, and 5 to 15 inches high to 10 to 25 inches long, 5 to 18 inches wide, and 5 to 15 inches high. In an embodiment, the length may be from 10 to 40 inches. The width may be from 10 to 40 inches. The height may be from 10 to 20 inches. Adjustment may be from and to any values within such ranges. Stated another way, in an embodiment, the length expansion may accommodate an increase in length of from 3 inches to 10 inches, or from 4 inches to 8 inches (e.g., about 5 inches). The width expansion may accommodate an increase in width of from 1 to 6 inches, or from 2 to 4 inches (such as about 3 inches). Stated another way, the length or width expansion may accommodate an increase in length or width from 10% to 80%, from 20% to 60%, or from 30% to 50% of the initial length or width (e.g., a length increase from 12 inches to 17 inches represents about a 40% increase in length, while a width increase from 8 inches to 11 inches represents about a 38% increase in width). While the illustrated configuration may not necessarily expand in height, it will be appreciated that another embodiment may be configured to expand in height, e.g., with the values and percentage increases noted above. The particular dimensions selected for the unexpanded configuration, as well as the expanded configuration, may of course depend on the particular items contemplated to be stored within such a crate.

As briefly noted previously, the side panels 102 may have a captured wall design 106 such as that shown in FIG. 2. The captured wall design 106 allows the crate 100 to expand in length, width, or both length and width by use of a center portion 108 and outer portions 110, as described herein. Other embodiments may include other elements configured to allow the side panels 102 to expand, as will be apparent to those of skill in the art. The floor panel 104, in the illustrated embodiment, selectively expands by sliding in directions corresponding to both the width and length. Details describing how the floor panel locks in place have already been described.

C. Example Break Down

FIGS. 9-12 illustrate an example embodiment where the adjustable reusable packaging crate 100 is broken-down or collapsed into a single flat generally planar state with no detachable elements.

Figure 9:
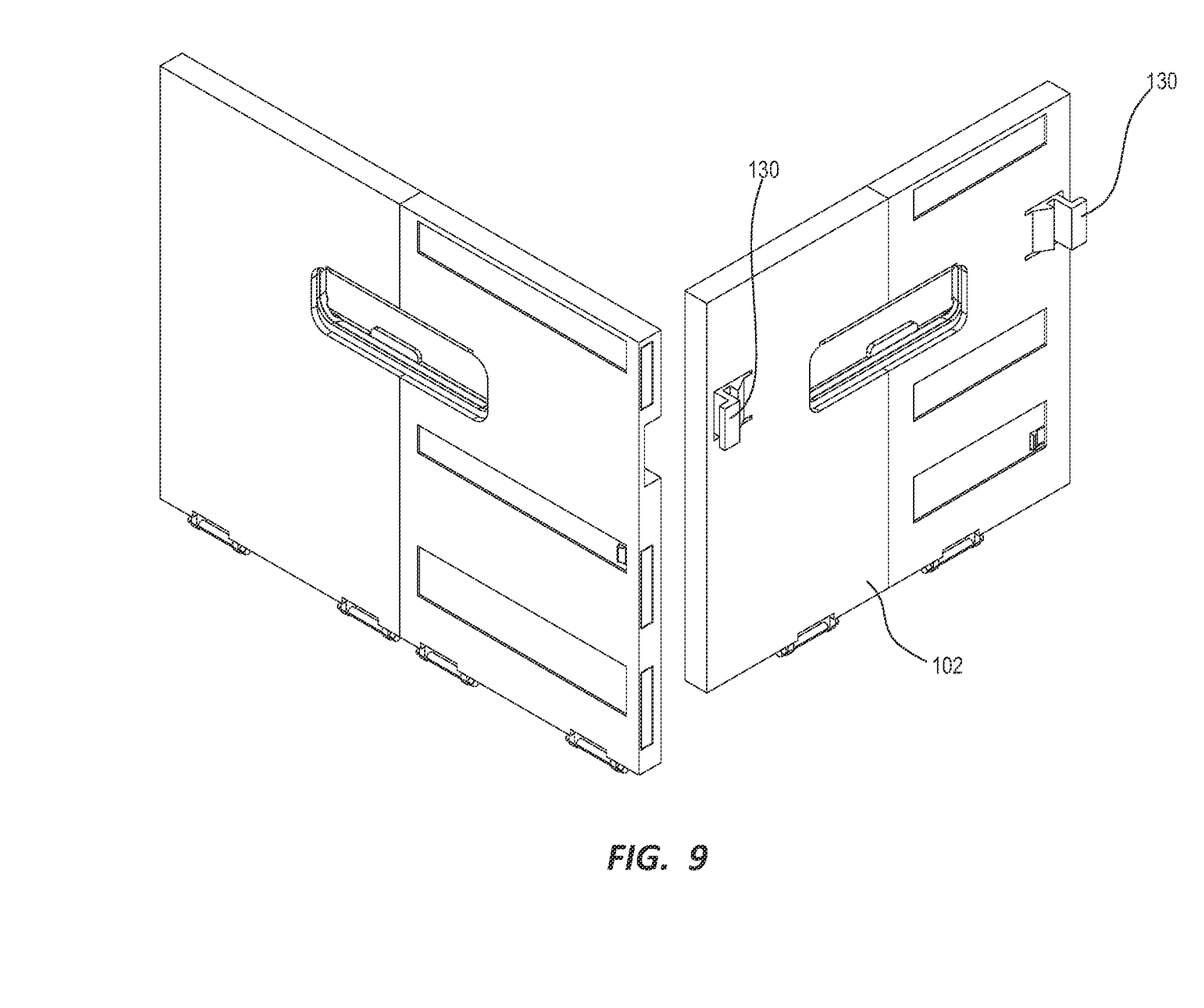
FIG. 9 shows an exemplary knob configured to hold the side panels in place when the adjustable reusable packaging crate is fully assembled.
Figure 10A:
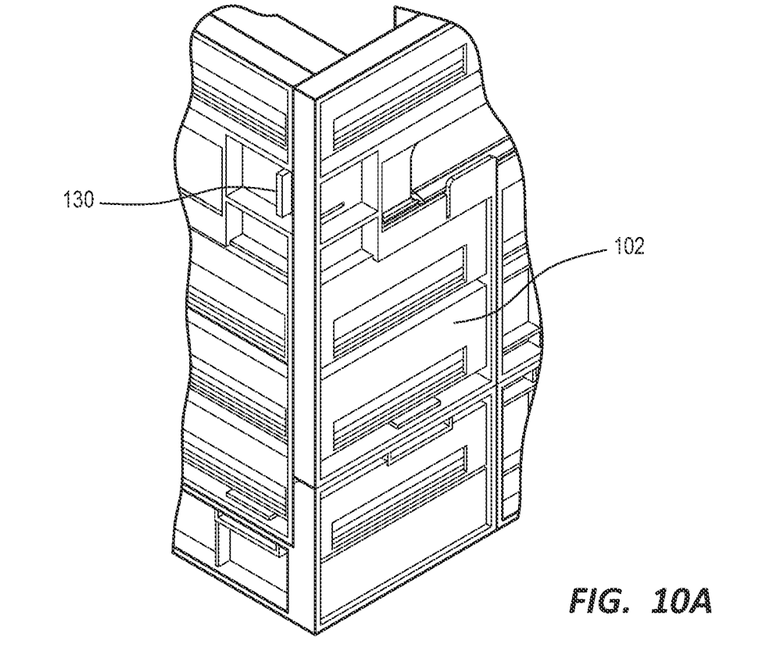
FIG. 10a shows an outside corner of the crate, showing how the knob of FIG. 9 holds the side panels is place.
Figure 10B:
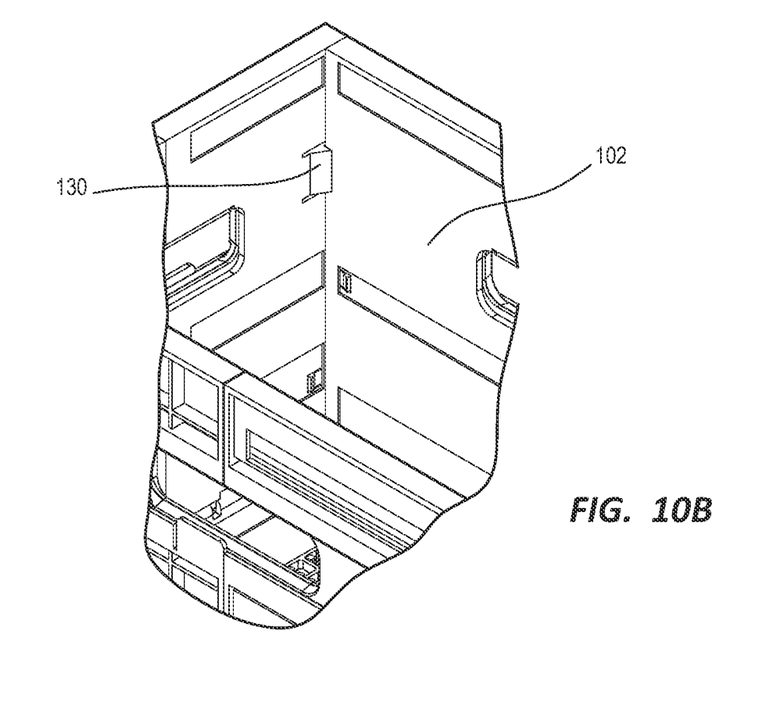
FIG. 10b illustrates the same configuration illustrating an inside corner of the crate, showing how the knob holds the two perpendicular adjacent side panels in place.

In some embodiments, adjacent perpendicular side panels 102 are held together with knobs 130 featuring a puzzle piece or keyed fit which hold the side panels 102 up when the crate 100 is fully assembled. An example of this knob 130 is shown in FIG. 9. How the knob 130 interacts with the side panels 102 is shown from an outside perspective relative to the crate 100 in FIG. 10a and from an inside perspective relative to the crate 100 in FIG. 10b. For example, a protrusion of the knob 130 may be received in a corresponding recess on the other side panel, when the knob 130 of one panel 102 couples to a recess of the adjacent perpendicular panel 102. Other mechanisms for coupling the adjacent side panels are of course also possible, e.g., such as latches, hooks, grooves, or other appropriate means to hold the side panel elements together.

Figure 11:
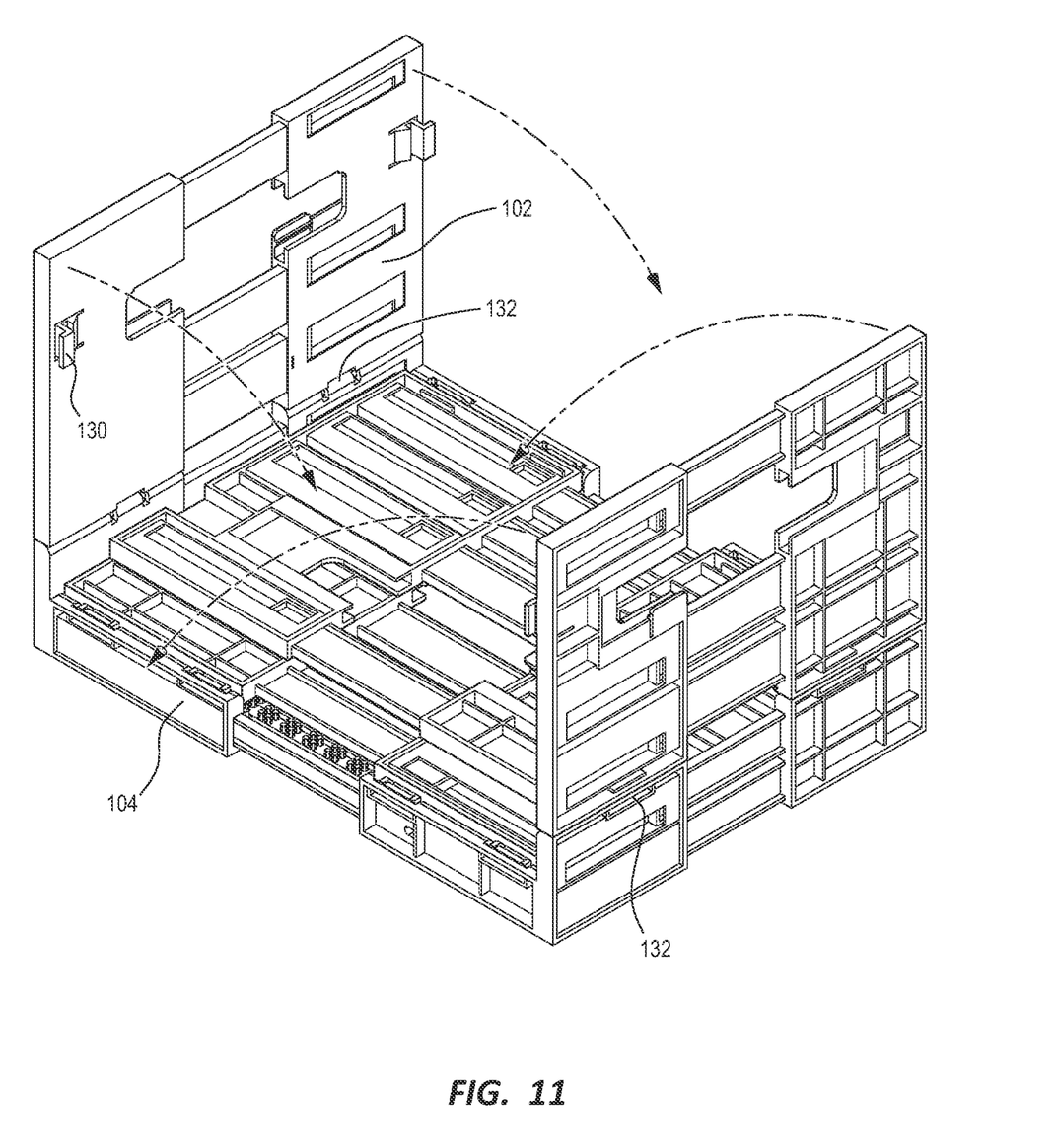
FIG. 11 shows the exemplary crate partially broken-down.

In FIG. 11, an example of the initial stages of breaking down the adjustable reusable packaging crate 100 is illustrated by first breaking down two parallel side panels 102 (e.g., the two longer sides). The two side panels 102 fold over the floor panel 104 on top of one another, as shown. Each side panel 102 may include a hinge at the bottom of the side panel, e.g., where the side panel 102 attaches to the underlying floor panel 104. Such hinges may be provided at different heights relative to the floor panel, to allow a first side panel to fold down directly over the floor panel 104 and center grid lock panel 120, with the opposite side panel folding down over the first side panel, as shown.

Figure 12:
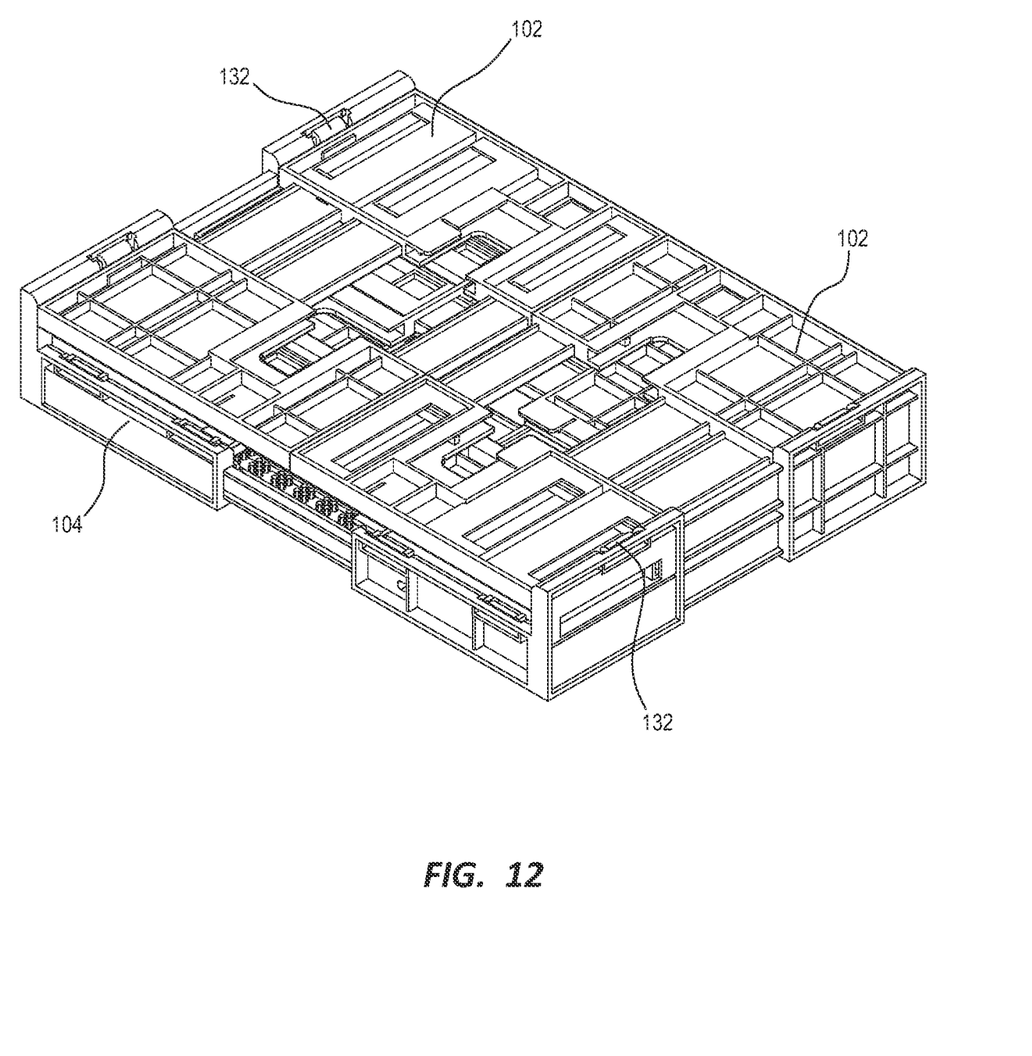
FIG. 12 shows the exemplary crate in the fully broken-down configuration.

FIG. 12 illustrates an example of the crate 10 in the fully broken-down single flat state where all four side panels 102 have been folded down, over the floor panel 104. In this example, all of the side panels 102 are all still connected to the floor panel 104 through a respective hinge element 132. As with the side panels collapsed in FIG. 11, the shorter wall side panels being collapsed in the transition from FIG. 11 to FIG. 12 may be hinged at locations relative to the floor panel that are higher up, to allow hinging at the appropriate height, collapsing each side panel 102 over the previous side panel, in turn, to result in the fully collapsed configuration seen in FIG. 12. While attachment of the side panels to the floor panel is illustrated via hinge elements 132, it will be appreciated that in other embodiments, the side panels 102 may be attached to the floor panel 104 using hooks, keyed connections, one or more hinges, or other appropriate means to attach the side panels and floor panels to one another in a manner that still allows for the crate to be broken-down into a flat, compact state as shown.

In an embodiment, one side panel of the crate (e.g., a front side) may have the ability to fold down (either partially or fully), to facilitate use of the crate as a retail display, for easier shopability, allowing a purchaser too more easily see the crate contents, and remove a desired item from the crate, through where such partially or fully collapsed wall previously stood. For example, if the front wall is fully collapsed, the crate then becomes a three-sided crate, open on the front side.

The present invention may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed:

1. A reusable packaging crate, comprising:
    a floor panel;
    a grid lock panel connected to the floor panel by a push mechanism configured to expand the grid lock panel upwards and from the floor panel; and
    four side panels each comprising a captured wall configured for telescopic sliding wherein each of the four side panels are connected to the floor panel by one or more hinge elements;
    wherein:
    the reusable packaging crate is adjustable to allow a change in length and/or width dimensions;
    a first side panel of the four side panels comprises a first floating handle mechanism comprising grooves configured to engage with mating protrusions within the captured wall of the first side panel.

2. The reusable packaging crate as recited in claim 1, wherein the reusable packaging crate breaks down into a flat generally planar state.

3. The reusable packaging crate as recited in claim 2, wherein the reusable packaging crate has no removable parts.

4. The reusable packaging crate as recited in claim 1, wherein the reusable packaging crate adjusts dimensions in width.

5. The reusable packaging crate as recited in claim 1, wherein the reusable packaging crate adjusts dimensions in length.

6. The reusable packaging crate as recited in claim 1, wherein the reusable packaging crate adjust dimensions in width and length.

7. The reusable packaging crate as recited in claim 6, wherein the width of the reusable packaging crate is adjustable between 5 inches and 25 inches.

8. The reusable packaging crate as recited in claim 6, wherein the length of the reusable packaging crate is adjustable between 5 inches and 25 inches.

9. The reusable packaging crate as recited in claim 1, wherein the reusable packaging crate is formed of high-density polyethylene, polypropylene, or other polymer.

10. The reusable packaging crate as recited in claim 1, wherein the captured wall of the first side panel is configured to allow adjustment to the dimensions of the reusable packaging crate, wherein the captured wall of the first side panel includes a center portion and two outer portions, where the center portion is telescopically received between and into the two outer portions of the first side panel, where during expansion of the first side panel, the center portion and outer portions are pulled away from one another, both center and outer portions being exposed, and when the first side panel is in a shortened or collapsed configuration, the center portion is completely or substantially completely received into the two outer portions of the first side panel.

11. The reusable packaging crate as recited in claim 1, wherein the first floating handle mechanism is configured to lock the first side panels in a collapsed and/or a plurality of expanded dimensions.

12. The reusable packaging crate as recited in claim 11, wherein the grooves of the first floating handle mechanism are on a top of a handle of the first handle mechanism, configured so that when the handle is pushed upwards, the captured wall of the first side panel is locked in place, and when the handle is pushed down, the first side panel is able to expand in length until the handle is pressed upwards, locking the grooves in the top of the handle of the first handle mechanism.

13. The reusable packaging crate as recited in claim 1, further comprising a plurality of pegs located on the floor panel.

14. The reusable packaging crate as recited in claim 13, wherein the grid lock panel comprises openings configured such that the openings interact with the plurality of pegs and lock the floor panel in a particular length and width dimension.

15. The reusable packaging crate as recited in claim 1, wherein the side panels are held vertically upright when the reusable packaging crate is fully assembled by a knob located on each side panel, which knob couples one vertical upright side panel with an adjacent perpendicular upright side panel.

16. A reusable packaging crate, comprising:
  a floor panel including a plurality of pegs and a center grid lock panel where the center grid lock panel and the pegs are configured to snap together, holding the center grid lock panel to the floor panel;
  two parallel sets of side panels, each side panel including a captured wall design configured for telescopic sliding and a floating handle mechanism; and
  four knobs, one in each of the side panels, configured to hold the side panels vertically upright in place, relative to one another;
  wherein each side panel is connected to the floor panel by a hinge element configured to allow each side panel to fold down over the floor panel to break down the reusable packaging crate into a flat generally planar state,
  wherein the reusable packaging crate is adjustable to allow a change in length and/or width dimensions by changing the dimensions of the side panels and the floor panel,
  wherein the floor panel dimensions may be adjusted by pulling the center grid lock panel upwards away from the plurality of pegs, releasing the center grid lock panel from the underlying pegs of the floor panel, adjusting the floor panel to new width and/or length dimensions, and then lowering the center grid lock panel down, so as to lock the center grid lock panel onto the pegs;
  wherein the length of a given side panel may be adjusted by pushing down on the floating handle mechanism of the given side panel separating grooves of the floating handle mechanism from mating protrusions within the given side panel, a center portion of the side panel thereby being released to telescopically slide in and out relative to outer portions of the capture wall design of the given side panel, the capture wall design with a selected wall length defined by the center portion and outer portions being locked in place by advancing the floating handle mechanism upwards, locking a new length for the given side panel in place.

17. A method for adjusting the length or width of a reusable packaging crate, comprising;
  providing the reusable packaging crate of claim 16;
  pressing the floating handle mechanism down to release a given side panel;
  pulling the center grid lock panel upwards to release the center grid lock panel from the floor panel;
  expanding or contracting the side panels in length and/or width;
  expanding or contracting the floor panel in length and/or width;
  pushing the floating handle mechanism of a given side panel upwards to lock the length or width of the given side panel; and
  pressing the center grid lock panel downward to lock openings of the center grid lock panel over the pegs of the floor panel, to lock the floor panel length and width in place.

18. A method for breaking down a reusable packaging crate, comprising;
  providing the reusable packaging crate of claim 16;
  releasing the side panels and knobs from one another;
  folding two side panels which are located opposite of one another on top of the floor panel; and
  folding the remaining two side panels on top of the two already folded side panels to put the reusable packaging crate into a flat generally planar state.

19. The reusable packaging crate as recited in claim 1, wherein the four side panels include the first side panel, a second side panel, a third side panel, and a fourth side panel, wherein the reusable packaging crate can be partially collapsed and locked such that the first side panel, the second side panel, the third side panel can be locked in a vertical orientation and the fourth side panel can be folded flat relative to the floor panel.

20. The reusable packaging crate as recited in claim 1, further comprising a bottom portion fixed to the floor panel wherein the push mechanism connects the grid lock panel to the bottom portion through the floor panel.

* * * * *